United States Patent Office 3,532,745
Patented Oct. 6, 1970

3,532,745
METHOD FOR PREPARING p-HYDROXY-BENZOIC ACID
Ichiro Hirao, 3–19 Sensuicho, Tobata-ku, Kitakyushu-shi, Japan
No Drawing. Filed Dec. 22, 1966, Ser. No. 603,734
Claims priority, application Japan, Dec. 24, 1965, 40/79,910
Int. Cl. C07c 65/04, 65/10
U.S. Cl. 260—521     4 Claims

ABSTRACT OF THE DISCLOSURE p-Hydroxybenzoic acid which is useful for the preparation of synthetic fibers, fungicides, food additives, etc. is prepared by dissolving an alkali metal salt of phenol in an aprotic polar solvent and contacting same with $CO_2$.

---

Salicyclic acid and para-hydroxy-benzoic acid, for example, have been prepared, respectively, by treating, at elevated temperatures and under high pressures, a powder of sodium or potassium phenolate with carbon dioxide. These reactions are known as Kolb-Schmitt reactions and are carried out between solid phase and gas phase. The reactions require long reaction times and elevated temperatures. In these reactions, the reaction systems unavoidably suffer from non-homogeneity and therefore vigorous stirring and the like are required. Further, the reactions can hardly be effected in a continuous manner.

In order to effect the above reactions effectively and economically, the provision of a liquid phase production process has heretofore been desired. However, since no suitable solvent has been found, hydroxy-benzoic acids must be prepared according to the conventional solid-gas phase reaction process.

The present inventors have now discovered that alkali metal salts of phenol can be dissolved or suspended in dimethylformamide, dimethylsulfoxide and similar aprotic polar solvents. The present invention is a novel method for preparing hydroxybenzoic acids in a liquid phase reaction which has not been attained heretofore.

The present method has the following characteristics: The reaction rate is extremely high in contrast to the conventional solid-gas phase reaction. The present reaction may be effected at markedly low temperatures and even under atmospheric pressure, whereby the byproduction of resinous substances is very low. The reaction can be effected in a continuous manner and the covered phenol can be recycled. Further, the yields of the resulting p-hydroxybenzoic acid is markedly high. For example, when potassium phenolate is dissolved in dimethylformamide and is reacted with carbon dioxide at 160° C. for 1 hour under a pressure of 5 kg./cm.$^2$, there is formed a mixture of hydroxybenzoic acids in a yield of 50%, in which the ratio of parahydroxybenzoic acid to salicyclic acid is about 10:1. However, in the production of parahydroxybenzoic acid according to the conventional solid-gas phase reaction, the reaction must be effected under pressure at an elevated temperature of above 200° C. Another characteristic of the present method is that even when sodium phenolate is used, the proportion of para-hydroxybenzoic acid in the resulting hydroxybenzoic acid can be made extremely high. For example, sodium phenolate is reacted in dimethylformamide at 120° C. for 1 hour under atmospheric pressure to obtain such results that the yield of the resulting hydroxybenzoic acids is 41% and the ratio of para-hydroxybenzoic acid to salicyclic is about 6:4. Further, sodium phenolate is reacted in dimethylsulfoxide at 100° C. for 30 minutes under a carbon dioxide pressure of 5 kg./cm.$^2$ to attain such markedly excellent results that the yield of the resulting hydroxybenzoic acids is 24% and the ratio of para-hydroxybenzoic acid to salicyclic acid is about 90:2.

A further characteristic of the present method is that the ratio of para-hydroxybenzoic acid (POB) to salicyclic acid (SA) in the resulting hydroxybenzoic acid mixture can be suitably varied according to the aprotic solvent used and the reaction temperature, as seen, for example, in the following table:

TABLE I

| Solvent | $CO_2$ pressure (kg./cm.$^2$) | Temperature (° C.) | Yield of hydroxybenzoic acid (percent) | POB:SA |
|---|---|---|---|---|
| DMSO [1] | 5 | 100 | 23 | 8:88 |
| DMSO | 5 | 140 | 31 | 81:13 |
| DMSO | 5 | 180 | 11 | 52:32 |

[1] DMSO=Dimethylsulfoxide.

In contrast thereto, in order to obtain para-hydroxybenzoic acid as the main product according to the conventional process, it was absolutely necessary to use potassium phenolate. If sodium phenolate is used, however the yield of the product acid was very low.

In the present invention, the metal salts of phenol are alkali metal salts such as potassium or sodium salts. As solvents in the present invention, there are used aprotic polar solvents such as, for example, dimethylformamide, diethylformamide, dimethylsulfoxide, diethylsulfoxide, hexamethylphosphoramide, hexaethylphosphoramide, dimethylacetamide, diethylacetamide, tertamethylurea and tetraethylurea.

In practicing the present invention, alkali metal salts of phenol such as potassium phenolate or sodium phenolate, are dissolved or suspended in one of said solvents and reacted with carbon dioxide. Alternatively, the phenol may be treated with alkali in one of said aprotic polar solvents and then reacted, after dehydration, with carbon dioxide. Further, free phenol may be present in the reaction system. The reaction temperature can be optionally selected from temperatures ranging from room temperature to 250° C., but the reaction is preferably effected at 100°–200° C. The reaction may be effected either at atmospheric pressure or under pressure.

After completion of the reaction, the solvents are recovered under reduced pressure. The resulting residues are dissolved in water and are then neutralized with mineral acids. These unreacted phenols are recovered by extraction with a solvent such as benzene. The remaining water layers are acidified with a mineral acid to obtain the desired hydroxybenzoic acids. If desired, it is also possible to adopt procedures such that salts of hydroxybenzoic acids which are deposited after completion of the reaction are separated by filtration, and then an alkali metal salt of phenol is added to the filtrate. The filtrate may be used in a recycle reaction. Further, depending on the solvent, the alkali may be added prior to the recovery of solvent to prevent the distillation of phenol together with the solvents.

The following examples illustrate the invention.

EXAMPLE 1

20 g. of potassium phenolate were dissolved in 140 g. of dimethylformamide. Into the solution, 6.6 g. of carbon dioxide were absorbed at atmospheric pressure. Subsequently, the temperature was elevated in a carbon dioxide atmosphere, and the carbon dioxide-absorbed solution was reacted at 180° C. for 1 hour. After completion of the reaction, the reaction product was cooled and the dimethylformamide was recovered under reduced pressure. The residual substance was dissolved in water and was neutralized with hydrochloric acid. Thereafter, the phenol was recovered by extraction with benzene (recovered amount: 7.1 g.), and the water layer was acidified with hydrochloric acid to obtain 7.8 g. of para-hydroxybenzoic acid and 0.8 g. of salicyclic acid.

EXAMPLE 2

The same reaction as in Example 1 was effected using dimethylsulfoxide in place of the dimethylformamide. After completion of the reaction, the reaction product was cooled, and 10.4 g. of a 50% caustic potash solution were added thereto. Thereafter, the same operations as in Example 1 were repeated whereby 8.7 g. of the phenol was recovered and 3.9 g. of para-hydroxybenzoic acid and 0.9 g. of salicyclic acid were obtained.

EXAMPLE 3

10 g. of potassium phenolate and 70 g. of dimethylformamide were charged to a 200 ml. autoclave provided with an electromagnetic stirrer. Into the resulting solution, carbon dioxide was absorbed with stirring under a pressure of 3–5 kg./cm.$^2$. After the absorption, the carbon dioxide pressure was adjusted to 5 kg./cm.$^2$ and the temperature was elevated to effect the reaction of solution at 160° C. for 1 hour. After completion of the reaction, the contents of the autoclave were cooled. Thereafter, the same treatment as in Example 1 was repeated, whereby 3.5 g. of the phenol were recovered and 4.6 g. of para-hydroxybenzoic acid and 0.6 g. of salicylic acid were obtained.

EXAMPLE 4

10 g. of sodium phenolate were dissolved in 70 g. of dimethylformamide. Into the solution, 3.8 g. of carbon dioxide were absorbed at atmospheric pressure. Thereafter, the temperature was elevated in a carbon dioxide atmosphere, and the solution was reacted at 140° C. for 1 hour. After completion of the reaction, the reaction product was cooled. Thereafter, the same operation as in Example 1 was effected to obtain 2.7 g. of para-hydroxyzenzoic acid and 2.3 g. of salicylic acid.

EXAMPLE 5

The same reaction as in Example 3 was effected using 10 g. of sodium phenolate in place of potassium phenolate whereby 2.7 g. of the phenol was recovered and 2.9 g. of para-hydroxybenzoic acid and 2.3 g. of salicylic acid.

EXAMPLE 6

20 g. of potassium phenolate were dissolved in 140 g. of hexamethylphosphoramide. Into the solution, carbon dioxide was absorbed for about 30 minutes at atmospheric pressure. Subsequently, the temperature was elevated in a carbon dioxide atmosphere and the reaction of solution was effected at 100° C. for 1 hour to obtain 5.3 g. of para-hydroxybenzoic acid and 0.5 g. of salicylic acid.

EXAMPLE 7

20 g. of potassium phenolate were dissolved in 100 g. of tetramethylurea. Into the solution, carbon dioxide was absorbed for about 30 minutes at atmospheric pressure. Subsequently, the temperature was elevated in a carbon dioxide atmosphere and the reaction of solution was effected at 150° C. for 1 hour to obtain 3.5 g. of para-hydroxybenzoic acid and 1.1 g. of salicylic acid.

EXAMPLE 8

20 g. of potassium phenolate were dissolved in 40 g. of dimethylformamide. Into the solution, carbon dioxide was absorbed for about 30 minutes at atmospheric pressure. Subsequently, the temperature was elevated in a carbon dioxide atmosphere, and the reaction of solution was effected at 130° C., for 1 hour to obtain 6.8 g. of para-hydroxybenzoic acid and 1.9 g. of salicylic acid.

EXAMPLE 9

In an autoclave provided with an electromagnetic stirrer, 20 g. of potassium phenolate were suspended in 200 g. of dimethylacetamide. Into the suspension, carbon dioxide was absorbed under a pressure of 5 kg./cm.$^2$. Subsequently, the temperature was elevated while maintaining the carbon dioxide pressure again at 5 kg./cm.$^2$, the reaction of the suspension was effected at 160° C. for 1 hour to obtain 2.5 g. of para-hydroxybenzoic acid and 0.2 g. of salicylic acid.

EXAMPLE 10

In an autoclave provided with an electromagnetic stirrer 10 g. of sodium phenolate were suspended in 70 g. of dimethylsulfoxide. Into the suspension, carbon dioxide was absorbed under a pressure of 5 kg./cm.$^2$. Subsequently, the temperature was elevated while maintaining the carbon dioxide pressure again at 5 kg./cm.$^2$, and reaction of the suspension was effected at 100° C. for 30 minutes, whereby 6.16 g. of the phenol was recovered and 2.7 g. of para-hydroxybenzoic acid and 0.06 g. of salicylic acid were obtained.

EXAMPLES 11–20

Additional examples are effected using 10 g. of sodium phenolate and 70 g. of solvent.

| Ex. | Solvent [1] | CO$_2$(kg./cm.$^2$) | Temp. (° C.) | Time (min.) | Product hydroxyacids [2] | |
|---|---|---|---|---|---|---|
| | | | | | POB | SA |
| 11 | DMF | At normal pressure. | 100 | 30 | 0.78 | 0.38 |
| 12 | DMF | do | 140 | 30 | 1.64 | 0.94 |
| 13 | HMPA | do | 140 | 30 | 1.06 | 0.27 |
| 14 | DMSO | do | 100 | 30 | 1.83 | 0.24 |
| 15 | DMSO | do | 140 | 30 | 0.53 | 0.12 |
| 16 | DMFO | 5 | 140 | 30 | 3.01 | 1.15 |
| 17 | DMF | 5 | 180 | 30 | 2.87 | 1.89 |
| 18 | HMPA | 5 | 140 | 30 | 4.17 | 0.34 |
| 19 | DMSO | 5 | 140 | 30 | 3.00 | 0.48 |
| 20 | DMSO | 5 | 180 | 30 | 0.67 | 0.42 |

[1] DMF=dimethylformamide; HMPA=hexamethyl-phosphoramide; DMSO=dimethylsulfoxide.
[2] POB=p-hydroxybenzoic acid; SA=salicylic acid.

What I claim is:

1. A method for preparing para-hydroxybenzoic acid and salicylic acid, which comprises adding sodium or potassium phenolate to an aprotic polar solvent selected from the group consisting of dimethylformamide, diethylformamide, dimethylsulfoxide, diethylsulfoxide, hexamethylphosphoramide, hexaethylphosphoramide, dimethylacetamide, diethylacetamide, tetramethylurea and tetraethylurea, and contacting same with carbon dioxide at a temperature from room temperature to 250° C.

2. A method according to claim 1, wherein the contacting is effected at atmospheric pressure.

3. A method according ot claim 1, wherein the contacting is effected under a pressure of about 5 kg./cm.$^2$.

4. A method according to claim 1, wherein the contacting is effected at a temperature of 100°–200° C.

References Cited

UNITED STATES PATENTS 3,405,170  10/1968  Levy _____ 260—520
3,213,155  10/1965  Schriesheim _____ 260—683.2

JAMES A. PATTEN, Primary Examiner

E. J. GLEIMAN, Assistant Examiner